Figure 1:
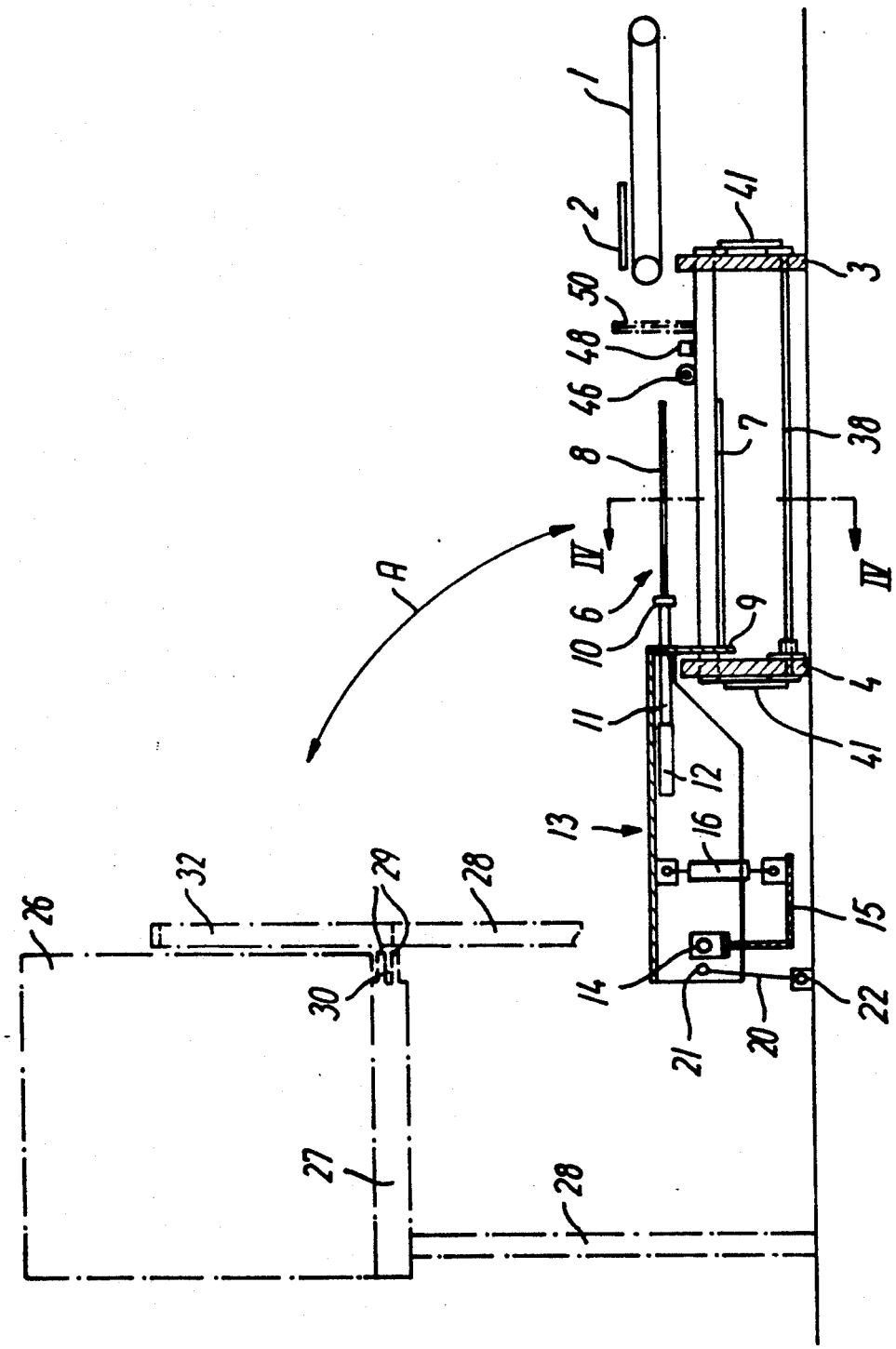

United States Patent
Bryde-Hansen

[11] Patent Number: 5,228,826
[45] Date of Patent: Jul. 20, 1993

[54] MACHINE FOR STACKING ROUND CONTAINER LIDS

[76] Inventor: Bent Bryde-Hansen, No. 13 Knudsvej, DK-4623 Ll. Skensved, Denmark

[21] Appl. No.: 753,574

[22] Filed: Sep. 3, 1991

[30] Foreign Application Priority Data

Apr. 23, 1991 [DK] Denmark .................................. 744/91

[51] Int. Cl.⁵ .......................................... B65G 29/00
[52] U.S. Cl. ............................. 414/798.2; 414/798.4
[58] Field of Search .............. 414/798.2, 798.7, 790.2, 414/789.9, 798.4, 795.6, 795.8, 788.2, 731, 790, 790.1; 198/409; 901/7

[56] References Cited

U.S. PATENT DOCUMENTS

| | | | |
|---|---|---|---|
| 3,463,293 | 8/1969 | Lederer | 198/399 |
| 3,623,593 | 3/1970 | Van Melle | 414/789.9 |
| 3,827,582 | 8/1974 | Lederer | . |
| 3,900,115 | 7/1975 | Kumagai | 414/795.8 |
| 4,391,560 | 7/1983 | Fardin | . |
| 4,435,114 | 3/1984 | Fardin | 414/798.9 |
| 4,618,054 | 10/1986 | Muller | 271/157 |
| 4,983,098 | 1/1991 | Heisler | 414/798.9 |
| 5,070,990 | 12/1991 | Heisler | 414/795.8 |
| 5,154,315 | 10/1992 | Dominico | 414/795.8 |

Primary Examiner—Michael S. Huppert
Assistant Examiner—Gregory A. Morse
Attorney, Agent, or Firm—Sughrue, Mion, Zinn, Macpeak & Seas

[57] ABSTRACT

The machine has a rotary spindle feed conveyor (1) for lids (50) which, are supplied to a stack holder (6). The stack holder has three fingers and is rotatably mounted on a bracket (15). An air cylinder (16) raises the stack holder to vertical while a link (21) simultaneously forces it to tilt transversely to the longitudinal direction of the machine towards a stacking table (26). The machine has a mechanism with levers (41) for quick setting the distance between the spindles (5).

7 Claims, 4 Drawing Sheets

MACHINE FOR STACKING ROUND CONTAINER LIDS

The invention relates to a machine for stacking round container lids, comprising two horizontally positioned spindles rotatably journalled in two end gables, means for rotating the spindles in the same direction and means for adjusting the distances between the spindles at either end.

It is known to make use of a machine of this type to assist in stacking or piling round container lids. The spindles are adjusted so that the distance between the ends at one end support is a little shorter than the distance between the ends at the other end support. The lids to be stacked are placed on edge between the spindles at the end where the spindles are closest to each other, and are subjected to rotation as a consequence of the rotation of the spindles. The lids are then capable of keeping themselves upright on edge and will travel slowly down towards the other end of the spindles.

Such container lids are generally provided with an upper thickened rim or flange determined to tightly fit the upper edge or a sealing bead on the container. With manual stacking of such lids it may be difficult to make the lids fit precisely. It has, however, turned out that the use of the prior machine causes the lids to be placed correctly next to each other, probably as a consequence of the combination of a translatory and a rotary movement.

When a suitable number of lids has been stacked, the stack is removed manually and laid on a stacking table from which the lids are passed further on for a supplementary treatment, e.g. packaging in bozes or the like. This is a labour-consuming process suffering further from the drawback that in connection with lids to be used for containers in the foodstuff industry the lids are easily contaminated due to the manual handling.

It is the object of the invention to provide a machine allowing the supply of the lids and the removal of the stacked lids to be effected without requiring any manual handling by the operating crew.

The machine according to the invention differs from the prior art machine in that it comprises at one end support a feed conveyor, at the other end support a stack holder with three fingers mounted on a lever hinged about a shaft and having means to swing the stack holder between a first position in which one finger of the stack holder is substantially parallel to the longitudinal axis of the spindles and below their plane. The other two fingers are located above the plane of the spindles, to a second position in which the pile holder is parallel to the tabletop of a stacking table forming an acute angle with the vertical, a stack disc displaceably mounted on the lever and a movable stop for barring the movement of the lids towards the other end gable when the stack holder has been swung out of its first position.

Thereby it is obtained first and foremost that the supply of lids, the stacking thereof and the removal of the stack may be effected without the operating crew having to touch the lids. This is obtained in that the lids are supplied by a feed conveyor, which for instance receives the lids directly from an ejector of an injection moulding machine, thereby ensuring that all the lids have the same side upward. When a desired number of lids has been fed to the stack the admission of lids to the stack holder is barred and this is swung upwards from its horizontal position and further through vertical towards a stacking table on which the stack is disposed by lowering the stack disc. The stack holder is then swung back to its horizontal position and the barring is terminated, following which the stacking of a new stack may start. The stack just disposed may be displaced along the stacking table by means of known mechanisms, not described in detail.

A preferred embodiment of the machine according to the invention is characterized in that the tabletop of the stacking table is substantially parallel to the longitudinal axis of spindles, that the shaft of the lever is supported on a bracket pivotal about an axis that is substantially parallel to the longitudinal axis of the spindles, and that the shaft end of the lever is extended beyond the shaft in the direction away from the stack holder and is connected with the base of the machine by means of a substantially vertically extending link.

In this embodiment the pile holder upon being swung out from its first horizontal position is moving mainly in a vertical plane, whereas the stack holder during the last part of its swing moves a little to the side and is carried towards the surface of the stacking table. This entails the advantage that the machine may be made considerably less bulky in comparison with an embodiment in which the stacking table is positioned perpendicular to the longitudinal direction of the spindles.

The described embodiment further presents the advantage that the lowermost finger of the stack holder, even when stacking lids with a comparatively small diameter, may be moved freely between the spindles, which might otherwise be a problem, if for instance the shaft of the lever had been a little inclined in order to allow abutting on the inclined stacking table. By using the described link between the shaft end of the lever and the base of the machine the complicated movement of the lever may be controlled by means of a few simple mechanical components.

A second embodiment of the machine according to the invention may include a sensor for detecting the quantity of lids in the stack holder and for automatically moving the lever from the first position to the second position when a desired quantity of lids has been inserted into the stack holder, means for displacing the stack disc along the stacking table, after the stack has been disposed thereon, and for returning the stack holder to the first position. The quantity of lids in the stack may for instance be determined by means of a photosensor detecting the height of the stack or the number of lids fed to the stack holder. This signal may activate the above referenced stop and the means for swinging the lever to its other position. A second means may then be activated to displace the stack disc to dispose the stack on the stacking table, following which the lever with stack holder is returned to its horizontal position. An interconnection of such detecting and activating means may in a known manner be effected by means of a microprocessor unit. The machine will then be able to run substantially without an operating crew, thereby entailing the further advantage that the motions of the machine, i.e. movement of the lever, displacement of the stack disc etc., may be effected more rapidly than is the case with manual operation.

A third embodiment of the machine according to the invention is characterized in that the means for adjusting the distances between the spindles at either end comprises two parallel adjusting shafts rotatably journalled in the end supports and connected with the other adjusting shaft by means of their respective toothed wheel, and wherein one adjusting shaft carries a worm wheel in engagement with a worm on a drive shaft with a hand wheel, spindle bearings carried in sliding blocks carried in sliding blocks displaceable in slideways at the end supports, the slideways extending in an acute angle relative to the plane of the spindles, and at each end of the adjusting shafts a crank and a link connecting the crank with the associated sliding block, the cranks being at one end support carried by crank arms clampable on the adjusting shafts and being at the other end support disposed on discs that are fixed against rotation on the adjusting shafts.

In the prior art machine the bearing houses of the spindles are displaceable in slits and the adjustment of the distance between the spindles is effected by releasing the bearing houses, setting the desired spacing and subsequently securing the bearing houses by nuts, bolts or the like. In the embodiment according to the invention a determined spacing between the spindles at one end support is set by turning the hand wheel on the worm shaft. The spacing between the spindle ends (a little shorter) is then set by adjusting the positions of the crank arms in relation to the adjusting shafts, following which the crank arms are clamped. This adjustment is to be made only once. Later, when the machine is to be used for stacking lids having another diameter the required distance between the spindles is adjusted by means of the handle wheel on the worm shaft. The rotary movement is transferred to the other end support by means of the adjusting shafts and due to the already effected setting of the position of the crank arms, the spindles at the other end support will have a spacing differing a little from the spacing at the first end support.

Figure 2:
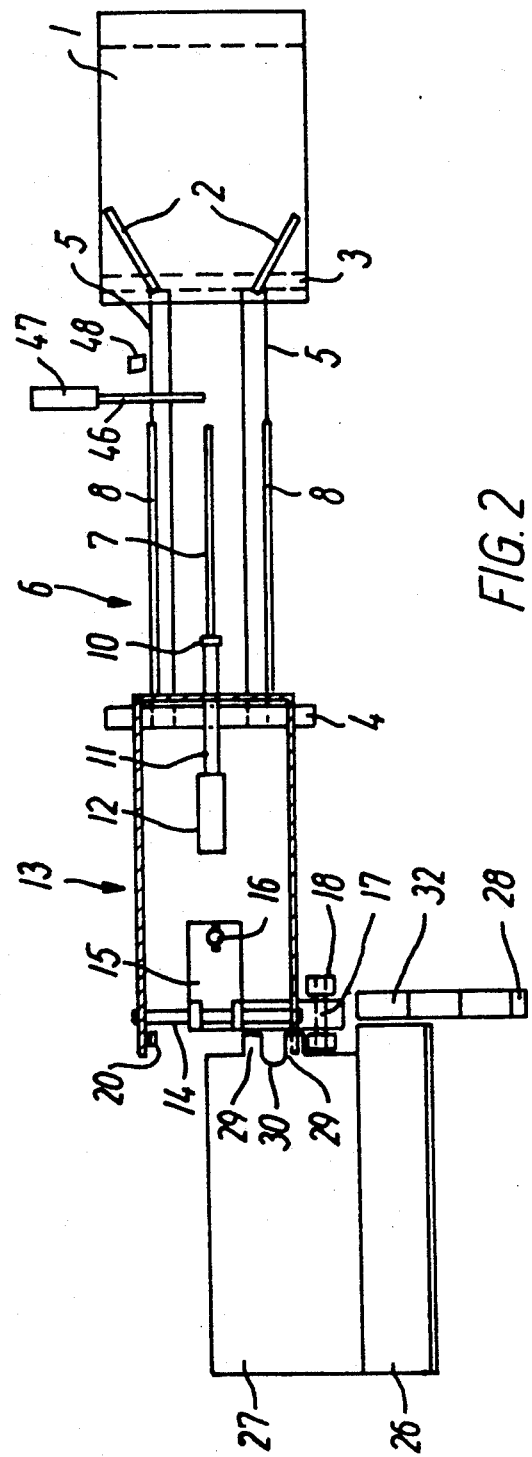
Figure 3:
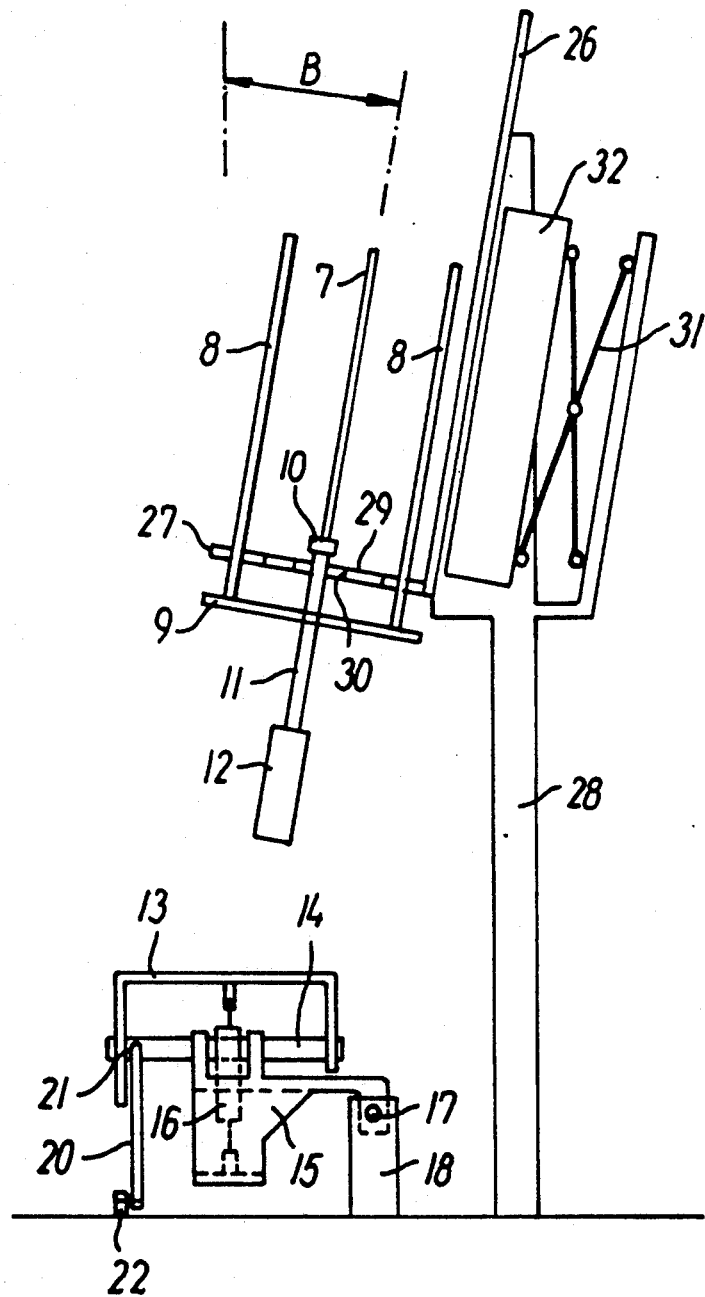
Figure 4:
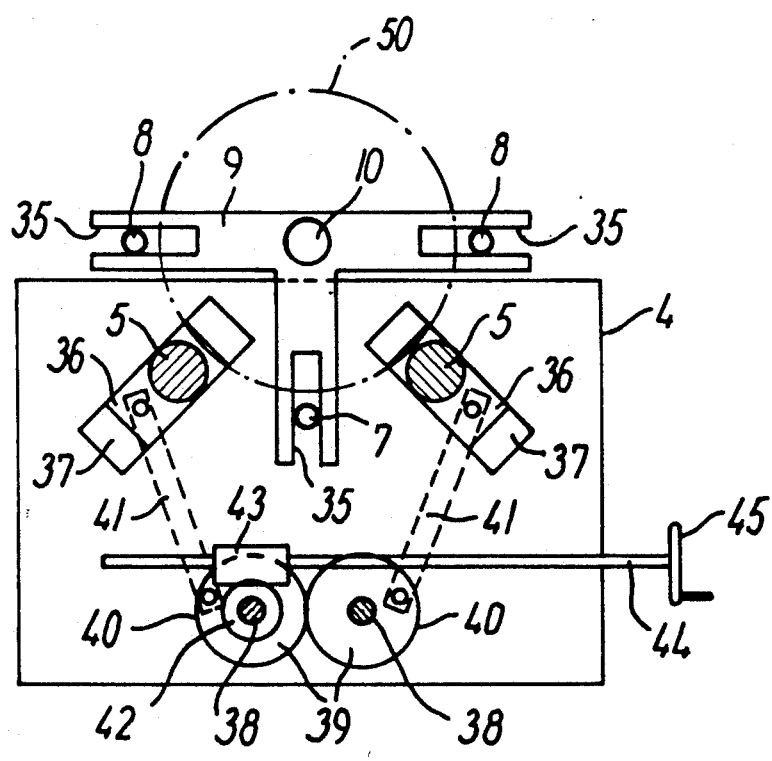

The invention will now be described in detail by an example with reference to the drawings, in which FIG. 1 is a partial section along the line I—I in FIG. 2 in a machine according to the invention, FIG. 2 illustrates the machine in FIG. 1, viewed from above, the upper side of the lever being, however, removed for the sake of clarity, FIG. 3 illustrates the machine in FIG. 1, viewed from the inlet end, the lever and the feed conveyor being, however, not shown, and FIG. 4 is a section along the line IV—IV in FIG. 1.

The machine illustrated in FIGS. 1 to 3 has a feed conveyor 1 with guides 2 for passing lids down onto two spindles 5 journalled at end gables 3 and 4. The spindles are rotated in a known manner by means of a belt drive and an electromotor. The spacing between the spindle ends is a little larger at the end support 4 than at the end gable 3. This adjustment is effected by means of an arrangement that will be described in connection with FIG. 4.

The machine further comprises a stack holder 6 having a bottom plate 9 with three fingers 7, 8, 8 extending in parallel with spindles 5, the lowermost finger 7 being positioned centrally between the spindles and a little below their common horizontal plane, whereas the two fingers 8 are positioned above the spindles. As illustrated in FIG. 4, bottom plate 9 is T-shaped and in each of the fingers of the T there are provided slits 35 allowing fingers 7, 8 to be displaced more or less from a centrally located stack disc 10. The two fingers 8 are adjusted so that the distance between them is a little larger than the diameter of the lids to be stacked, while the finger 7 is adjusted so that its distance from the centre of stack disc 10 is a little larger than the radius of the lids to be stacked.

The stack holder 6 is carried by a lever 13 that is pivotal about a shaft 14, as shown by the arrow A. Stack disc 10 is carried by a piston rod 11 associated with a working cylinder 12 secured on lever 13.

Shaft 14 is pivotally journalled in a bracket 15 and between bracket 15 and lever 13 there is inserted a working cylinder 16 which upon activation swings lever 13 and thus also stack holder 6 from the horizontal position illustrated in FIG. 1 to the vertical position shown in FIG. 3. As it will most clearly appear from FIG. 3, bracket 15 is journalled to be tiltable about a horizontal shaft 17 parallel to the longitudinal direction of the machine. Shaft 17 is carried in supports 18 resting on the base of the machine. At shaft 14 lever 13 is extended in the direction opposite stack holder 6 and the extended end is at 21 connected with the base of the machine at a point 22 by means of a link 20. As it will most clearly appear from FIG. 3 a rotation of lever 13 about shaft 14 from the horizontal to vertical causes the point 21 to attempt to move down towards the base of the machine. Such a movement is, however, impeded by link 20, resulting in the bracket pivoting about shaft 17. The combination of the swinging movement about shaft 14 and the pivoting movement about shaft 17 causes the stack holder to be lifted out of its horizontal position in a substantially vertical plane and, in step with its approaching its vertical position it is being pivoted out at an angle B corresponding to the angle of the tabletop 26 of a stacking table positioned parallel to the longitudinal direction of the machine and supported by the framing 28 of the machine. The bottom of the stacking table is provided with a shelf 27 which at one end has two tongues 29 forming between them a slit 30 to receive stack disc 10 and its piston rod 11.

Once the stack holder has been made to occupy the position illustrated in FIG. 3, working cylinder 12 is activated and stack disc 10 then moves downwards and the stack is disposed on tongues 29, following which the stack holder is returned to its horizontal position. A housing 32 is now pushed out by means of a scissors mechanism 31 in alignment with the just disposed stack and a another scissors mechanism accommodated within housing 32 is activated so as to displace the stack along table 26, thereby giving way to a new stack. The described scissors mechanisms are generally known to an expert within the field concerned and they are therefore neither shown nor described in detail.

The machine further includes a photosensor 48 to detect the number of lids passing by and a stop consisting of a working cylinder 47 whose piston rod 46 by a signal from the photosensor 48 is pushed transversely to the path of the lids and bars the advancing of the lids.

FIG. 4 illustrates the end support 4 with spindles 5 journalled in sliding blocks 36 running in slideways 37 provided at the end support. Sliding blocks 36 are moved by levers 41 which at their other end engage crank 40 secured on associated discs mounted on the opposite side of the end support. The discs are secured on adjusting shafts 38 each of which carries a toothed wheel 39 so that the toothed wheels are in engagement with each other. One adjusting shaft 38 also carries a worm wheel 42 in engagement with a worm 43 on a drive shaft 44 rotatable by means of a hand wheel.

At the other end support 3 there is a similar arrangement, the cranks being, however, in this case not carried by discs but by crank arms clamped to the adjusting shafts 38.

I claim:

1. A machine for stacking a quantity of round container lids (50), comprising two horizontally positioned spindles (5) rotatably journalled in two end supports (3, 4), means for rotating the spindles in the same direction and means for adjusting the distances between the spindles at either end support, said machine further comprising:

at one end support (3) a feed conveyor (1), at the other end support (4) a stack holder (6) with three fingers mounted on a lever (13) hinged about a shaft (14) and having means (16) to swing the stack holder (6) between a first position in which one finger (7) of the stack holder is substantially parallel to the longitudinal axis of the spindles (5) and below the plane thereof, and the other two fingers (8) are located above the plane of the spindles (5), to a second position in which the stack holder (6) is parallel to a tabletop (26) of a stacking table (26, 27) forming an acute angle with vertical, a displaceable stack disc (10) mounted on the lever (13) and a movable stop (46) for barring the movement of the lids (50) when the stack holder (6) has been swung out of its first position.

2. A machine as claimed in claim 1, wherein the tabletop (26) of the stacking table is substantially parallel to the longitudinal axis of the spindles (5), the shaft (14) is supported on a bracket (15) pivotal about an axis (17) that is substantially parallel to the longitudinal axis of the spindles (5), and a shaft end of the lever (13) extends beyond the shaft (14) in a direction opposite from the stack holder (6) and is connected with a base of the machine by means of a substantially vertically extending link (20).

3. A machine as claimed in claim 1 further comprising a sensor (48) for detecting the quantity of lids (50) in the stack holder (6) and for automatically moving the lever (13) from the first position to the second position when a desired quantity of lids has been inserted into the stack holder (6), means (31, 32) for displacing the stack disc on the stacking table, after the stack has been disposed thereon, and means for returning the stack holder (6) to the first position.

4. A machine according to claim 1 wherein the means for adjusting the distances between the spindles (5) at either end support comprise two parallel adjusting shafts (38) rotatably journalled in the end supports (3, 4) and connected by means of a toothed wheel (39) on each respective adjusting shaft and wherein one of said adjusting shafts (38) carries a worm wheel (42) in engagement with a worm (43) on a drive shaft (44) with a hand wheel (45), spindle bearings carried in sliding blocks (36) displaceable in slideways (37) at the end supports, the slideways (37) extending at an acute angle relative to the plane of the spindles (5), and at each end of the adjusting shafts (38) a crank (40) and a link (41) connecting the crank (40) with the associated sliding block (36), the cranks (40) at one end support (3) being carried by crank arms clampable on the adjusting shafts and at the other end gable (4) being disposed on discs that are fixed against rotation on the adjusting shafts.

5. A machine as claimed in claim 2 further comprising a sensor (48) for detecting the quantity of lids (50) in the stack holder (6) and for automatically moving the lever (13) from the first position to the second position when a desired quantity of lids has been inserted into the stack holder (6), means (31, 32) for displacing the stack disc on the stacking table, after the stack has been disposed thereon, and means for returning the stack holder (6) to the first position.

6. A machine according to claim 2, wherein the means for adjusting the distances between the spindles (5) at either end support comprise two parallel adjusting shafts (38) rotatably journalled in the end supports (3, 4) and connected by means of a toothed wheel (39) on each respective adjusting shaft and wherein one of said adjusting shafts (38) carries a worm wheel (42) in engagement with a worm (43) on a drive shaft (44) with a hand wheel (45), spindle bearings carried in sliding blocks (36) displaceable in slideways (37) at the end supports, the slideways (37) extending at an acute angle relative to the plane of the spindles (5), and at each end of the adjusting shafts (38) a crank (40) and a link (41) connecting the crank (40) with the associated sliding block (36), the cranks (40) at one end support (3) being carried by crank arms clampable on the adjusting shafts and at the other end gable (4) being disposed on discs that are fixed against rotation on the adjusting shafts.

7. A machine according to claim 3, wherein the means for adjusting the distances between the spindles (5) at either end support comprise two parallel adjusting shafts (38) rotatable journalled in the end supports (3, 4) and connected by means of a toothed wheel (39) on each respective adjusting shaft and wherein one of said adjusting shafts (38) carries a worm wheel (42) in engagement with a worm (43) on a drive shaft (44) with a hand wheel (45), spindle bearings carried in sliding blocks (36) displaceable in slideways (37) at the end supports, the slideways (37) extending at an acute angle relative to the plane of the spindles (5), and at each end of the adjusting shafts (38) a crank (40) and a link (41) connecting the crank (40) with the associated sliding block (36), the cranks (40) at one end support (3) being carried by crank arms clampable on the adjusting shafts and at the other end support (4) being disposed on discs that are fixed against rotation on the adjusting shafts.

* * * * *